3,056,677
PROCESS FOR PREPARING A CACAO PRODUCT
Frank P. Colten, Newton, Mass., and John J. O'Neil, Tully, N.Y., assignors to General Foods Corporation, White Plains, N.Y., a corporation of Delaware
No Drawing. Filed Apr. 7, 1960, Ser. No. 20,559
12 Claims. (Cl. 99—26)

The present invention relates to a process for preparing improved cocoa products. More specifically, the present invention relates to a process for preparing a dutched cocoa of darker intensity than has heretofore been available for food use and to cocoa butters which are far superior in terms of bloom resistance in chocolate to any cocoa butter heretofore known.

Chocolate and cocoa products are derived from the fruit of *Theobroma cacao* which consists of pods containing numerous seeds embedded in a mass of pulpy mucilaginous material. The seeds in turn consist of two curiously folded cotyledons and a radicle enclosed within a fleshy envelope of fibrous and mucilaginous material. The whole seeds in raw or dried form are commonly referred to as cacao beans and it is in this sense that the term "beans" is used herein. Drying of the raw beans converts the fleshy envelope into a dense hard sheath designated in the trade and herein as "shell." The dried kernels within the envelope or shell from which chocolate and cocoa products of commerce are produced after suitable processing is for brevity and ease of description referred to hereinafter as the "nibs."

Dutching, or the reacting of sodium, potassium, ammonium and magnesium compounds with cacao material such as cacao nibs, cocoa liquor or cocoa powder has been employed for many years to give cocoa powder a darker, more chocolate color. A strong demand for extremely dark cocoa exists in the cookie trade since it is desirable for chocolate sandwich-type cookies to have the darkest possible color. Heretofore, the prior art in dutching cocoa has used alkali metal salts. These salts such as sodium hydroxide, sodium carbonate, potassium carbonate, etc. all result in alkali metal residues remaining in the product after dutching. Furthermore, such alkalis affect the final pH due to the residue which remains in the cacao material.

The traditional processing of raw cacao beans to prepare them for the manufacture of chocolate and cocoa products involves fermentation which produces characteristic changes in the color, flavor and aroma of the beans. The color of the beans after fermenting will vary considerably depending upon the degree of fermentation and the particular variety employed. Thus, in the case of beans such as Arriba and Venezuelean which are known to be well fermented, the color after fermentation will be brown. On the other hand, beans such as Sanchez, Haiti, Bahia, etc. which are known to be poorly fermented will vary in color from a purple to a gray shade.

The literature on the alkali process of cacao is relatively sparse because the process has been kept secret by many manufacturers in both the United States and Europe. Although the main theme is fairly simple, there are many variations of procedure. A cacao material such as beans, nibs (fine or coarse), liquor or partly defatted liquor, broken cocoa press cake, or powder may be used. Large or small quantities of water may be used with the full amount or only a portion of any one or any combination of the permitted alkaline substances. The nibs may be partially or completely roasted, and of any type, although there is a general feeling that flavor beans such as Arriba or Venezuelan should not be dutched but may be blended with alkalized common types such as Accra, Bahia, Sanchez, etc. Also, nibs and dry alkali may be mixed and treated with water or may be ground dry to a paste, which then may or may not be water-treated. The alkali may be added all at once or in stages. The processing may be in open, jacketed mixers, so that the moisture removal begins almost as soon as the water is added, or in closed mixers or kettles where the water may be retained until certain results are obtained. In addition to these variations, there is a choice of a batch or continuous process.

Typical of the prior art processes is the treatment of cleaned, roasted cacao nibs with an alkali such as potassium carbonate at a temperature of 170° F. After a period of about 1 hour, the nibs are removed and re-roasted lightly after which they are ready for grinding to alkali-process chocolate liquor which is pressed and converted to cocoa powder and cocoa butter. Compared with natural cocoa made from the same cleaned, roasted nibs without alkali processing, the product is much darker, milder in acid character, and has a pH in a water solution of about 7.0, whereas the natural cocoa will be about 5.4. It will have a very dark maroon-brown color; the untreated cocoa will be light reddish-brown. It will seem to be more soluble and more easily wetted by water. On standing in hot water or milk, it will suspend better and show less fat separation on the surface. Although not appealing in a beverage, it will provide the baker with a cocoa having greater coloring strength and strong chocolate flavor both of which are necessary for filled cookies and devil's-food cakes.

The conventional alkali treated cocoas generally have a higher ash content than natural cocoa, and specifically the ash content is higher in sodium or potassium salts depending upon the particular alkali used.

The cocoa butter prepared from conventional alkali treated cacao material, like cocoa butter obtained from non-alkali treated cacao material which is known in the trade as prime cocoa butter, is highly susceptible to fat bloom. The bloom or discoloration occurs in fat containing chocolate materials during storage and under conditions where the temperature fluctuates rapidly. Candy bars, for example, and other chocolate confections tend to acquire a pronounced tan discoloration. As a result of this discoloration, a chocolate product which may otherwise be wholesome and edible is rendered unmarketable because of its unattractive appearance. The problem of bloom, while appearing to be a condition of spoilage, is merely a change in the crystal structure of a portion of the fat wherein the fat crystallizes at the surface of the chocolate.

The problem of bloom in chocolate compositions has been long recognized in the industry and many attempts have been made to solve it. However, in the past, little has been known about the changes in the chocolate composition which leads to discoloration created therein. As a means of controlling this discoloration, the industry in the past has employed the technique of adding various emulsifying agents or foreign fats to the chocolate in an attempt to modify the performance of the fat crystals.

In the past, the presence of alkali metal salts or alkali metal salt complexes in the dutched cocoa have presented the user with problems such as development of undesirable flavors and a cocoa which is unsuitable for use by people on salt-free diets.

It is an object of the present invention to produce a dark dutched cocoa which is eminently satisfactory for use in dark filled cookies or in devil's-food cake production. It is yet a further object of the present invention to produce a dark dutched cocoa which is free of alkali metal salt residues or complexes. It is still a further object of the present invention to produce a cocoa butter free of additives which is far less susceptible to bloom in chocolate products than is prime cocoa butter.

It has now been discovered that the foregoing objects of the present invention may be obtained by treating a cacao material with an ammonium bicarbonate solution at temperatures below about 140° F., then increasing the temperature of the cacao material and ammonium bicarbonate solution and maintaining such temperature for an extended period of time.

It is pointed out in the prior art that ammonium bicarbonate was undesirable because it decomposed at temperatures at which dutching is usually carried out. However, it has now been unexpectedly discovered that by permitting the cacao material to absorb ammonium bicarbonate solution at low temperatures, sufficient ammonium bicarbonate is present within the cellular structure of the cacao material to permit a reaction within the cells. While the exact mechanism by which the present invention operates is unknown, it is believed that the increase in temperature during processing causes the ammonium bicarbonate to decompose thus building up an atmosphere of ammonia and carbon dioxide within the cell walls of the cacao material. The released ammonia and carbon dioxide which is trapped within the cellular structure is in intimate contact with all of the cellular constituents and thus readily reacts with such constituents to provide the desired degree of dutching. In the case of liquor, the final product will vary somewhat under identical processing conditions from what would be expected when processing powder or nibs since cellular distribution and fat distribution in the case of liquor are different than in the case of nibs.

The term "cacao material" as used in the present invention refers to raw, partially roasted or roasted cacao nibs or beans, cocoa powder, chocolate (cocoa) liquor and like materials. The cacao materials are mixed with an ammonium bicarbonate solution at a temperature of less than about 140° F. and preferably at a temperature of about 50–90° F. The ammonium bicarbonate is employed at a level up to about 3.4% by weight of the cacao material. While higher levels may be employed satisfactorily for shorter periods of time, it is not desirable to do so in the United States due to the limit set by the Definitions and Standards of Cacao Products in Title 21, Part 14, Section 14.1(a) of the Federal Food, Drug and Cosmetic Act of 1944, as amended. The time of treatment at any particular temperature will depend among other factors on the ammonium bicarbonate concentration, the cacao material being treated and the temperature employed, since at the higher temperatures the ammonium bicarbonate decomposes much more rapidly. The ammonium bicarbonate solution is prepared by adding the desired amount of ammonium bicarbonate to sufficient water to form about a 5–35% ammonium bicarbonate solution and preferably a 13.7% ammonium bicarbonate solution which contains up to about 3.4% ammonium bicarbonate by weight of the cacao material to be treated. Preferably, at temperatures of about 50–90° F. the cacao material is kept in contact with a 13.7% ammonium bicarbonate solution up to about 90 minutes. Most preferred, where nibs are the cacao material being treated, is treatment of the nibs at about 70–90° F. for about 60 minutes with a 13.7% ammonium bicarbonate solution.

After such treatment, the cacao material and ammonium bicarbonate solution is heated to an elevated temperature above 180° F., preferably to a temperature of about 180°–250° F. and most preferably to a temperature of 240°–250° F. and maintained under such conditions for at least 10 hours. Where the cacao material is treated at temperatures above 212° F., the treatment is carried out in a sealed drum. The pressure employed is the autogeneous pressure of the steam and other gases at the particular temperature. The length of time the cacao material is subjected to such temperatures in the presence of the ammonium bicarbonate solution will depend among other factors on the cacao material employed, the ammonium bicarbonate concentration, and the degree of darkness desired in the cocoa. Preferably, where nibs are the cacao material being treated, the nibs are treated with a 13.7% ammonium bicarbonate solution at a temperature of 240°–250° F. for about 21–33 hours after first having been soaked in the ammonium bicarbonate solution for about one hour at a temperature of 70–90° F. After treatment at such elevated temperatures, the solution is drained or removed from the cacao material and the cacao material may then be further processed in the usual fashion; chocolate liquor being pressed to obtained cocoa powder and cocoa butter and nibs roasted if necessary and then ground to provide liquor which may be pressed.

As an alternative, the nibs after treatment at elevated temperatures in the order of 180°–250° F. for at least ten hours may be removed from the ammonium bicarbonate solution and then maintained at a temperature of greater than about 160° F. for one or more hours in the absence of excess moisture. Thus, where it is desired to utilize batch-type equipment to maximum efficiency, it is possible to continue the balance of the dutching treatment in the absence of an excess of moisture such as in a hot air atmosphere, thus releasing the dutching drums for treatment of subsequent batches.

It is possible, therefore, to dutch cacao material by treatment with an ammonium bicarbonate solution or by treatment with an ammonium bicarbonate solution followed by a hot air treatment.

While the process of the present invention will enable the production of substantially darker colored cocoas with all types of cacao beans, the greatest increase in dark brown color is found in beans containing a high percentage of purple or gray color components.

The following examples set forth procedures demonstrating several means of carrying out the present invention:

EXAMPLE 1

An ammonium bicarbonate dutching solution was prepared by slowly adding 137 pounds of ammonium bicarbonate to 1000 pounds of water at a temperature of about 80° F. and the mixture stirred until the ammonium bicarbonate completely dissolved.

Four thousand pounds of partially roasted, puffed Sanchez nibs at 70–90° F. were placed in a dutching drum seven feet long and six feet in diameter and the pressure-tight cover sealed. The dutching solution was pumped into the rotating drum and after the dutching solution was completely added, soaking was carried out at a temperature of about 80° F. for one hour, the drum rotating at about 3 r.p.m.

At the end of the soaking period, the temperature of the mixture was raised to 245° F. and such temperature was maintained for thirty hours. At 4-hour intervals the drum was rotated for about a 5-minute period to insure complete mixing. At the end of the 30 hours, the pressure was released from the drum and the ammonium bicarbonate solution was drained from the nibs. The nibs were then placed in a chamber having an air temperature of 230° F. and kept in such chamber for 30 hours. At the end of such period of time, the nibs were removed from the chamber and the dutched nibs were then roasted at 300° F. in the conventional manner.

EXAMPLE 2

An ammonium bicarbonate dutching solution was prepared as in Example 1.

Four thousand pounds of partially roasted, puffed Sanchez nibs at a temperature of 70–90° F. were placed in the dutching drum of Example 1, and the pressure tight cover sealed. The dutching solution was pumped into the rotating drum and after the dutching solution was completely added, soaking was carried out at a temperature of about 80° F. for one hour, the drum rotating at about 3 r.p.m.

At the end of the soaking period, the temperature of the mixture was raised to 250° F. and a pressure of 15 p.s.i.g. The temperature was maintained for approximately 44 hours, the drum being rotated at 4-hour intervals for a 5-minute period to insure complete mixing. At the end of the 44 hours, the pressure was released from the drum and the ammonium bicarbonate solution was drained from the nibs. The moisture level of the nibs after this treatment was 20–29%.

The dutched nibs were roasted at 300° F. in the conventional manner.

The color of dutched cocoa produced by the process of the present invention was evaluated and compared with the color of cocoas dutched with the other ten legally accepted alkalis. Dutching for purposes of this comparison was carried out at 200° F. for 47 hours employing the maximum legal concentration of alkali which is equal in neutralizing value to three parts by weight of anhydrous potassium carbonate per 100 parts by weight of nibs.

The cocoas were baked as cookies employing the following recipe and procedure:

*Cookie Recipe*

|  | Gram |
| --- | --- |
| Flour (all purpose) | 100.0. |
| Granulated sugar | 50.0. |
| Vegetable shortening | 25.0 (21.0 if liquor). |
| Table salt (NaCl) | 1.0. |
| Sodium bicarbonate ($NaHCO_3$) | 0.3. |
| Distilled water (160–190° F.) | 34.0 (ml.). |
| Cocoa | 5.0 (9.65 if liquor). |

Flour, sugar, table salt, sodium bicarbonate, cocoa, and shortening were added to small mixing bowl. The shortening was cut in and mixed by hand using a spatula.

The ingredients were mixed for 1 minute at slow speed using a kitchen mixer.

The 34 ml. of distilled water at a temperature of 160–190° F. was added to give the resulting dough mixture a temp. of 90–95° F. The dough was mixed for 3 minutes at slow speed. The dough pH was between 7–8.

The dough which was quite plastic and soft was rolled in different directions on metal sheet, reballed and rolled as before.

When dough was approximately 2/32" thick and uniform, it was cut into dough strips approximately 4" x 2½" and placed on a cookie baking sheet (new heavy gauge aluminum sheets). If texture of dough is not free from holes or breaks, the dough must be reballed, rolled and another dough strip cut.

One-half inch strips of dough were placed around edges of dough strips to protect the strips from burning at the edges. The dough was baked for 7 min. at 475° F. and baked cookie had a moisture content under 5%.

The baked cookies were allowed to cool for approximately 20 min. at which time visual observations were made.

Following visual observations, Gardner Automatic Color Difference Meter readings were taken on the cookies after the instrument was standardized with brown tile having the following values: $L=30.8$; $a=14.2$; $b=11.4$. The brown tile was standardized against a white tile supplied by Gardner Laboratories, Inc., Bethesda, Md., which had the following values: $L=93.2$; $a=-0.7$; $b=4.1$.

The results obtained with the Gardner Automatic Color Difference Meter (Model AC-1, No. 94) are set forth below in Table 1. The L values are black to white (lightness) values ranging from black at 0 to white at 100. The $+a$ values represent a degree of redness and the $-a$ values represent a degree of greenness. The $b$ values represent a degree of yellowness. The E values represent color difference units which are calculated by the formula $E=\sqrt{\Delta L^2 + \Delta a^2 + \Delta b^2}$. Thus, the greater the E value, the lighter the color. For purposes of comparison the E values in Table 1 were calculated on the basis of the ammonium bicarbonate sample, which was used as a standard, having an E value of 0.00. The minimum color difference detectable by eye was ±0.3 unit.

TABLE 1

| Alkali | Visual | L | a | b | E |
| --- | --- | --- | --- | --- | --- |
| Sodium bicarbonate | Med. dark brown (red). | 25.4 | 7.3 | 6.0 | 1.77 |
| Sodium carbonate | do | 25.3 | 6.9 | 6.0 | 1.37 |
| Sodium hydroxide | do | 26.4 | 7.2 | 6.5 | 2.40 |
| Pot. bicarbonate | do | 25.7 | 7.3 | 6.1 | 1.93 |
| Pot. carbonate | do | 25.6 | 7.4 | 6.3 | 2.01 |
| Pot. hydroxide | Med. brown (red). | 28.0 | 7.7 | 6.8 | 4.01 |
| Amonium bicarbonate | Dark brown (darkest). | 24.7 | 5.7 | 5.7 | 0.00 |
| Ammonium carbonate | Dark brown | 26.6 | 6.3 | 6.2 | 2.05 |
| Ammonium hydroxide | Med. dark brown. | 25.1 | 8.8 | 6.9 | 3.35 |
| Magnesium carbonate | Grey | 28.5 | 8.1 | 7.0 | 4.68 |
| Magnesium oxide | do | 25.6 | 7.9 | 6.5 | 2.51 |

The results clearly demonstrate the unexpected improvement in color obtained with ammonium bicarbonate.

The process of the present invention also permits the production of a cocoa butter which is far superior to prime cocoa butter with respect to its resistance to bloom when used in chocolate. By the term "bloom" as used in the present invention is meant the phenomena well known to those skilled in the art wherein the fat in a chocolate product appears on the surface of such product as an unattractive, irregular white film. The appearance of bloom has been attributed to the recrystallization of the fat in an unstable form.

The cocoa butter of the present invention is one which has unique properties heretofore unknown in the case of prior art cocoa butter. The cocoa butter of the present invention is softer than prime cocoa butter, having a different solids index as measured by dilatation at a given temperature, and has a different free fatty acid content.

The superior bloom resistance of chocolates prepared with cocoa butter of the present invention was clearly demonstrated by preparing two samples from a standard chocolate coating composition, one sample (A) containing only prime cocoa butter and the other sample (B) containing only the cocoa butter of the present invention. The samples had the following compositions:

Sample A:  Percent
  Chocolate liquor (ca. 53% cocoa butter) ---- 31.0
  Sugar—extra fine ---------------------- 48.0
  Prime cocoa butter ---------------------- 20.5
  Lecithin ---------------------------------- 0.5
Sample B:
  Chocolate liquor (ammonium bicarbonate dutched) ------------------------- 31.0
  Sugar—extra fine ---------------------- 48.0
  Cocoa butter (derived from ammonium bicarbonate dutched cacaoo material) ---------- 20.5
  Lecithin ---------------------------------- 0.5

Both samples were refined on commercial refining rolls at a fineness of 18 (0.0018 inch particle size) and a viscosity of 45° MacMichaels. Once the refining was completed, the chocolate mass was mixed for 2 hours at 140° F. and then molded off and tempered. These samples were then used in evaluating bloom resistance of the two cocoa butters.

The samples were melted at 130° F., tempered by stirring until the temperature reached 82° F. (the tempering being carried out at a room temperature of 60° F.), poured into molds and allowed to stand at 60° F. for one-half hour and then at 50° F. for 24 hours. The molded chocolate was then subjected to three and six accelerated storage cycles. The term "accelerated storage cycle" as used in the present invention refers to storage conditions wherein the chocolate sample is subjected to a temperature of 88° F. for four hours and then to a temperature of 60° F. for 24 hours.

Table 2 sets forth the results obtained when Samples A and B were subjected to accelerated storage for three cycles and six cycles.

TABLE 2

| Accelerated Storage— Number of Cycles | Sample A | Sample B |
|---|---|---|
| None (control) | Excellent—High gloss no bloom. | Excellent—High gloss no bloom. |
| 3 cycles | Mild bloom—no gloss. | No bloom—slight gloss. |
| 6 cycles | Severe bloom. | No bloom—no gloss. |

The present invention permits for the first time the use in chocolates and other confections of a bloom resistant cocoa butter which is free of additives such as foreign fats like vegetable and dairy fats, emulsifiers and the like.

While the above invention has been described in part by means of specific examples, reference should be had to the appended claims for a definition of the scope of the invention.

What is claimed is:

1. A process for preparing improved cacao products which comprises treating cacao material with an ammonium bicarbonate solution at a temperature below 140° F. and then increasing the temperature of the cacao material and ammonium bicarbonate solution to above 180° F. and maintaining such temperature for an extended period of time.

2. A process for preparing improved cacao products which comprises treating cacao material with an ammonium bicarbonate solution at a temperature of 50°–90° F. and then increasing the temperature of the cacao material and ammonium bicarbonate solution to a temperature above 180° F. and maintaining such temperature for an extended period of time.

3. A process for preparing improved cacao products which comprises treating cacao material with an ammonium bicarbonate solution containing not more than about 3.4% ammonium bicarbonate by weight of the cacao material at temperatures of 50°–90° F., increasing the temperature of the cacao material and the ammonium bicarbonate solution to a temperature of about 180°–250° F. and maintaining such temperature for an extended period of time.

4. A process for preparing improved cacao products which comprises treating a cacao material with a 13.7% ammonium bicarbonate solution containing about 3.4% ammonium bicarbonate by weight of the cacao material at temperatures of 70°–90° F. for about 60 minutes, increasing the temperature of the cacao material and the ammonium bicarbonate solution to a temperature of about 240°–250° F. and maintaining such temperature for at least ten hours.

5. A process for preparing improved cacao products which comprises treating a cacao material with a 13.7% ammonium bicarbonate solution containing about 3.4% ammonium bicarbonate by weight of the cacao material at temperatures of 70°–90° F. for about 60 minutes, increasing the temperature of the cacao material and the ammonium bicarbonate solution to a temperature of about 240°–250° F. and maintaining such temperature for about 21–33 hours.

6. A process for preparing improved cacao products which comprises treating a cacao material with an ammonium bicarbonate solution at a temperature below 140° F., increasing the temperature of the cacao material and ammonium bicarbonate solution, maintaining such increased temperature for an extended period of time, removing the cacao material from the ammonium bicarbonate solution and treating the cacao material in the absence of excess moisture at a temperature above 160° F. for more than about one hour.

7. A process for preparing improved cacao products which comprises treating a cacao material with a 13.7% ammonium bicarbonate solution containing about 3.4% ammonium bicarbonate by weight of the cacao material at temperatures of 70°–90° F. for about 60 minutes, increasing the temperature of the cacao material and the ammonium bicarbonate solution to a temperature of about 240°–250° F., maintaining such temperature for about 21–33 hours, removing the cacao material from the ammonium bicarbonate solution and treating the cacao material in the absence of excess moisture at a temperature above 160° F. for more than about one hour.

8. The process according to claim 1 wherein the cacao material employed is raw cacao beans.

9. The process according to claim 1 wherein the cacao material employed is partially roasted cacao nibs.

10. The process according to claim 1 wherein the cacao material employed is roasted cacao nibs.

11. The process according to claim 1 wherein the cacao material employed is cocoa powder.

12. The process according to claim 1 wherein the cacao material employed is chocolate liquor.

References Cited in the file of this patent

"The Chemistry Flavouring and Manufacture of Chocolate Confectionery and Cocoa," by Jensen, J. & A. Churchill, 40 Gloucester Place, Portman Square, London, 1931, pages 158 and 159.